United States Patent [19]

Watkins

[11] Patent Number: 5,085,938
[45] Date of Patent: Feb. 4, 1992

[54] CHEMICALLY TREATED FIBERS AND METHOD OF PREPARING AND METHOD OF USING TO REINFORCE POLYMERS

[75] Inventor: Johnson C. Watkins, Pittsburgh, Pa.

[73] Assignee: PPG Industries, Inc., Pittsburgh, Pa.

[21] Appl. No.: 441,208

[22] Filed: Nov. 29, 1989

[51] Int. Cl.$^5$ .................. D02G 3/00; B32B 9/00; C08G 77/04; C08G 77/20

[52] U.S. Cl. .................. 428/378; 428/375; 428/391; 428/902; 524/588; 524/837; 525/477; 528/25; 528/32

[58] Field of Search .................. 428/375, 378, 391; 526/279; 524/588, 837; 525/477; 525/25, 32

[56] References Cited

U.S. PATENT DOCUMENTS

| | | | |
|---|---|---|---|
| 3,332,900 | 7/1967 | Reischl | 260/29.1 |
| 3,369,009 | 2/1968 | MacArthur | 260/80.81 |
| 3,418,094 | 12/1968 | Marsden et al. | 65/3 |
| 3,556,754 | 1/1971 | Marsden et al. | 65/3 |
| 3,585,103 | 6/1971 | Thomson | 428/251 |
| 3,647,743 | 3/1972 | Nagamatsu | 260/37 AL |
| 3,715,371 | 2/1973 | Thomson | 524/558 |
| 3,944,574 | 3/1976 | Marsden et al. | 260/349 |
| 4,002,651 | 1/1977 | Marsden et al. | 260/349 |
| 4,038,456 | 7/1977 | Marsden et al. | 428/391 |
| 4,055,701 | 10/1977 | Marsden et al. | 428/391 |
| 4,146,585 | 3/1979 | Ward et al. | 260/827 |
| 4,172,930 | 10/1979 | Kajitani et al. | 525/56 |
| 4,233,809 | 11/1980 | Graham | 57/250 |
| 4,244,844 | 1/1981 | Molinier et al. | 260/9 |
| 4,246,145 | 1/1981 | Molinier et al. | 428/391 |
| 4,277,593 | 7/1981 | Scheve | 428/429 X |
| 4,291,136 | 9/1981 | Keogh | 525/102 |
| 4,292,234 | 9/1981 | Borel | 524/565 |
| 4,330,444 | 5/1982 | Pollman | 523/411 X |
| 4,401,598 | 8/1983 | Karl et al. | 260/349 |
| 4,439,558 | 3/1984 | Tamosauskas | 523/203 X |
| 4,447,495 | 5/1984 | Engle, III | 428/429 |
| 4,467,105 | 8/1984 | Kotzsch et al. | 556/444 |
| 4,473,618 | 9/1984 | Adzima et al. | 428/378 |
| 4,491,650 | 1/1985 | Rizk et al. | 525/102 |
| 4,530,876 | 7/1985 | Brodmann | 428/283 |
| 4,544,724 | 10/1985 | Sogah et al. | 528/10 |
| 4,808,478 | 2/1989 | Dana et al. | 428/391 |

FOREIGN PATENT DOCUMENTS

| | | |
|---|---|---|
| 0119011 | 9/1984 | European Pat. Off. |
| 53-38787 | 4/1978 | Japan |
| 60-221344 | 11/1985 | Japan |
| 1264432 | 2/1972 | United Kingdom |
| WO81/02742 | 10/1981 | World Int. Prop. O. |

OTHER PUBLICATIONS

The Manufacturing Technology of Continuous Glass Fibres, K. L. Loewenstein, Elsevier Scientific Publishing Co., N.Y., 1973, pp. 211-214.
"Hercules Azide Chemical Aqueous Size Application of Azidosilanes to Glass Fibers" by F. J. Kolpak, PH.D.

Primary Examiner—George F. Lesmes
Assistant Examiner—James D. Withers
Attorney, Agent, or Firm—Kenneth J. Stachel

[57] ABSTRACT

Chemically treated fibers have an aqueous chemical treating composition and are useful for reinforcing thermoplastic polymers most notably polyacetals and polyphenylenesulfide. The aqueous chemical treating composition has a water soluble silylazide in an effective coupling agent amount, and one or more stabilizing agents selected from a fortified film forming polymer present as an oil-in-water emulsion, an unsaturated organo-compound present in an amount to stabilize the reinforced matrix polymer from degradation by silylazide derivatives or additives, a water soluble polymer, like poly(vinyl alcohol) or silylated poly(vinyl alcohol) present in the composition in an amount greater than 10 weight percent of the composition and mixtures thereof, and water in an effective amount for application of the composition to the fibers. The polymer in the emulsion forms a film through evaporation of volatiles or through curing and is present in the emulsion in about 10 to about 80 weight percent total solids and is present in the aqueous chemical treating composition in an amount of at least around ten weight percent of the solids of the composition. The fortified emulsion has a fortifying amount of a nonionic surfactant, polyvinyl alcohol, silylated poly(vinyl alcohol), or mixture thereof. Additionally, a fiber lubricant can be present which is essentially free of any primary or secondary nitrogen containing moieties present in an effective lubricating amount.

30 Claims, No Drawings

CHEMICALLY TREATED FIBERS AND METHOD OF PREPARING AND METHOD OF USING TO REINFORCE POLYMERS

This application is a continuation of application Ser. No. 07/090,638, filed Aug. 28, 1987, now abandoned.

The present invention is directed to chemically treated glass and/or carbon and/or aromatic polyamide fibers, bundles, strands and yarn and their method of preparation and the method of producing fiber reinforced plastics utilizing them.

Fiber reinforced plastics (FRP) involve myriad types of fibers, matrix polymers, such as thermoplastics and thermosets, and a plethora of processes to produce them. The manner of production depends upon the types of fibrous reinforcement and of matrix polymer. In these various processes variations occur in the manner and time of adding the reinforcement. For instance, molding of thermoplastic objects and parts involves one of two process routes. One approach is the combination of the fibers and the matrix thermoplastic polymer to produce a fiber reinforced pellet of the matrix polymer, which is subsequently molded. The other approach involves combining the fibers and matrix polymer just prior to a molding operation. The production of fiber reinforced thermosets combines the fiber reinforcement and thermosettable matrix resin in a partially cured state as in bulk molding compound or sheet molding compound that is capable of further curing upon molding.

In producing FRP products some of the forms of the fiberous reinforcement include: chopped fibers and bundles of fibers or strands, chopped strand or fibrous mat, continuous strand or fibrous mat, bundles of strands or rovings, and entangled continuous fibrous or strand mats and entangled, chopped and continuous fibrous or strand mats and woven and nonwoven fabrics. Generally there are two classes of polymers for FRP materials, and these are the thermosetting and thermoplastic polymers. The thermosetting polymers, which when cured lack the process advantage of heat flowability like thermoplastics, have some property advantages over many thermoplastic FRPs. For instance, the fiber reinforced thermoset materials enjoy good thermal stability at temperatures less than the degradation temperature of the thermosetting polymer. Although recently numerous thermoplastic polymer formulations used in FRPs result in relatively good thermal and performance properties. For instance, the high molecular weight crystalline polymers such as acetal homopolymers and copolymers have good short term thermal stability and alkaline stability, and they have good long term properties of creep resistance and property retention when exposed either to hot air at temperatures up to 220° F. (104° C.) or water as hot as 180° F. (82° C.). It has been theorized that the good thermal properties result from the C—C bonds inhibiting thermal unzipping of the polymer chain while these bonds in conjunction with hydroxyethyl terminal groups impart some alkaline resistance. In addition the homopolymer of acetal has good chemical resistance, dimensional stability, abrasion and frictional resistance and unnotched izod impact strength up to or exceeding 100 foot-pounds per inch in an essentially constant, notched izod impact strength from −40 to 212° F. Another thermally stable thermoplastic polymer is polyphenylene sulfide (PPS) which is a crystalline aromatic polymer. While achieving the positive attributes of having good thermal stability, such thermoplastic polymers require higher processing temperatures. For instance, the PPS has a melting point of 550° F. (288° C.), and the acetal copolymers have processing temperatures of around 360° to 480° F. (182°–249° C.).

Taking full advantage of the good processing features and performance properties of such thermoplastic polymers mandates the use of process and property enhancing fibrous reinforcement. U.S. Pat. No. 3,647,743 utilizes styrene coated glass fibers to improve the impact strength of glass fiber reinforced acetal. This teaching shows an enhancement of a performance property that ordinarily decreases from the addition of glass fibers since polyacetal resins belong to a class of resins that may have a reduction in the impact resistance just from combining the resin with fibrous reinforcements.

It is an object of the present invention to provide chemically treated fibrous reinforcement for polymeric matrices and particularly thermoplastic matrices that compliment the performance properties of the matrix resin and that have good processing characteristics.

It is an additional object of the present invention to provide chemically treated fiberous reinforcement where the chemical treatment has good shelf life and good shear stability and when applied to the fibers and when having a reduction in moisture and when on fibers combined with matrix polymer results in fiber reinforced plastics having good properties.

It is a further additional object of the invention to provide fiber reinforced acetal and polyphenylene sulfide having good long term heat stability.

SUMMARY OF THE INVENTION

The foregoing and other objects of the invention are accomplished by having chemically treated high modulus fibers like glass and/or carbon and/or aromatic polyamide fibers having an aqueous chemical treating composition having present along with water a water-soluble, silylated azide in a stable form and one or more stabilizing agents selected from: a matrix-polymer-compatible film former in a fortified dispersion, silylated or at least a medium molecular weight poly(vinyl alcohol) and/or an unsaturated organo-compound. In addition other materials that may be present include: matrix-polymer-compatible film former if not already present, and one or more fiber lubricants, where both are essentially free of any primary or secondary nitrogen-containing moieties, additives to increase the aqueous viscosity of the aqueous chemical treating composition and suitable catalysts for the film forming polymer.

The amount of the silyl azide present in the aqueous chemical treating composition is an effective coupling agent amount for the high modulus fibers in order to associate the high modulus fibers to the matrix polymer they are to reinforce. The film forming polymer is present as an oil-in-water dispersion having a solids content ranging from around 1 to 80 weight percent along with the presence of suitable surfactants. This dispersion has an extra quantity of non-ionic emulsifier added to it to produce the fortified dispersion. This quantity is an effective amount to allow the addition of the silyl azide to the dispersion while generally maintaining integral droplets in the dispersion where the droplets generally can swell without bursting. The amount of the dispersion of the film forming polymer present in the aqueous chemical treating composition is in the range of at least around 10 weight percent of the solids of the aqueous chemical treating composition. In lieu of or in addition to the film forming polymer fortified dispersion, the silylated poly(vinyl alcohol) or at least medium molecular poly(vinyl alcohol) assists in stabilizing the silyl azide in aqueous solutions as a stabilizing agent itself or by fortifying the film forming dispersion. Also, in lieu of or in addition to the foregoing components the unsaturated organo-compound is present in an effective amount to counter the free radicals generated from abstraction by triplet nitrenes of the silyl azide and from any impurities present in the silyl azide and aqueous chemical treating composition.

The aqueous chemical treating composition can be applied to the fibers during their formation or in post formation treatment steps. The chemically treated fibers are useful in reinforcing thermoplastic polymers such as polyolefins like polypropylene and poly(phenylene sulfide), but they are most useful in reinforcing polymers such as polyacetals including both homopolymers and copolymers thereof. The chemically treated glass fibers have their moisture reduced prior to combination with the matrix polymer they are to reinforce. The fibers having the moisture reduced residue of the aqueous chemical treating composition are combined for reinforcement purposes with the matrix polymers by extrusion, injection or compression molding techniques or by any premolding combination technique employed for such molding techniques.

DETAILED DESCRIPTION OF THE INVENTION AND PREFERRED EMBODIMENT

In producing fiber reinforced polymers for further manufacture into parts and shaped devices, the fibers usually have a coating of one or more coupling agents. The coupling agent links or assists in linking the reinforcing fiber to the matrix polymer in the shaped part. Three types of coupling agents of those that are theoretically possible find varying degrees of commercial acceptance. The most acceptable and readily used organo coupling agent is the organofunctional silanes. Also used but with less frequency than the silanes, are the Werner compounds. Used least of all are the silyl azide compounds. The latter tend to be more expensive and in producing azides of comparable costs to the other coupling agents, impurities result in the azide formulation. These impurities can engender problems in applying the azide coupling agent to the fiber. Also, the silyl azides themselves are more difficult to use in aqueous solutions, since if they are hydrolyzed in the usual manner for organosilane coupling agents, they tend to gel or precipitate out of solution.

The difficulties in utilizing silyl azides in aqueous solutions is one concern that was considered in developing the present invention. Another consideration in utilizing azide type coupling agents involves the ease of application of a size containing them to the reinforcement fibers. For instance, the application should take advantage of high speed fiber production processes. For this to occur, the aqueous chemical treating composition or size should have good shear stability and good shelf life to maintain its chemical properties while in piping systems for pumping the size to be applied to the fibers. Also, the chemically treated fibers should not have decreased handling properties resulting from the chemical treatment or its moisture reduced residue. Another consideration in producing fibers of the present invention involves producing fibers useful with thermoplastics like polyphenylenesulfide and acetals including both the homopolymers and copolymers thereof. For these types of matrix polymers the chemical treating composition or its moisture-reduced residue on the fibers should assist in producing the reinforced matrix polymer with good thermal stability and should not reduce the capabilities of the matrix polymer. An example of such a reduction in capabilities is the aforementioned situation of acetals without reinforcement having higher izod values than reinforced acetals. In that case the suggested solution was a reinforcement fiber having a dual chemical treatment, a first chemical treatment as a sizing composition, and a second treatment or overtreatment of a styrene polymer to provide reinforced acetals with higher izod values. Even with a stable aqueous chemical treating composition with the azidosilane being used to treat glass fibers for reinforcing polyacetals, an additional consideration was discovered regarding a relatively excessive rate of weight loss of the matrix polymer occurring in the fiber reinforced polyacetal.

The aqueous chemical treating composition used in the present invention provides a solution to the aforementioned concerns. The aqueous chemical treating composition has good, high shear properties and good shelf stability and provides the chemically treated glass fibers with good handling properties. Also, the glass fibers with a moisture-reduced residue of the chemical treating composition produce fiber reinforced polymers of polyacetal and polyphenylenesulfide that have excellent physical properties so that the good thermal properties of the resin are not diminished.

In the following description and in the claims appended hereto the term "stabilizing agent" refers to chemical materials used in an aqueous solution to counter some effect caused by silyl azide coupling agents or formulations containing silyl azides including any impurities. The different stabilizing agents may have different stabilizing functions for the silyl azide or formulation containing same.

The aqueous chemical treating composition has water-soluble silylazides in an effective coupling agent amount. The silylazides, which have also been referred to as azidosilanes, generally have the formula "silane-R-Azide". The azide generally is sulfonyl azide or azidoformate. Also, the azide can be a diazoalkanoate. These azidosilanes have such moieties as the following:

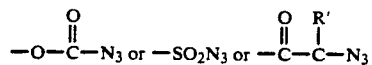

The R groups are organic radicals and R' is hydrogen or lower alkyl. Further examples of these compounds are taught in U.S. Pat. Nos. 3,715,371; 4,277,593; 4,401,598 and 4,055,701 which are hereby incorporated by reference for their teachings concerning the silylazides or azidosilanes. The effective coupling agent amount results in a coupling of the fiber surface with the matrix polymer to give the reinforced polymer adequate tensile strength. The relationship between azidosilane quantity and tensile strength is generally linear up to some maximum amount that varies depending on the type of matrix polymer. Generally the effective coupling agent amount is in the range of around 5 to about 70 weight percent of the solids of the aqueous chemical treating composition. Preferably, this amount is in the range of around 25 to around 55 weight percent of the solids. Suitable examples of commercially available azidosilanes include: the AZ Cup agents available from Hercules, Inc., Wilmington, Del., under the trade designations AZ-CUP MC, AZ-CUP E, and AZ-CUP N.

The film forming polymer in the aqueous chemical treating composition is one that forms a film upon evaporation of volatiles or through curing by the addition of a curing agent in the aqueous chemical treating composition which when heated, cures or assists in curing the film forming polymer. Generally, the film forming polymer is any film forming polymer that is compatible with the fiberous reinforceable matrix polymer. Nonexclusive examples of suitable polymeric film formers include: epoxy polymers, epoxy polyurethane copolymers, epoxy polymers with polyurethane curing agents and bisphenol A thermoplastic polyesters. Suitable epoxy polymers present in the form of an oil-in-water dispersion or emulsion, hereinafter referred to as an emulsion, include those discussed in U.S. Pat. No. 4,615,946 (Temple) which is incorporated herein by reference. One such epoxy polymer emulsion is that available from Interez, Inc., under the trade designation "EPI-REZ CMD 35201" material. This epoxy resin has an epoxy resin dispersion which has 60 percent nonvolatiles and the only volatile material is water and the dispersion has a weight per epoxide of approximately 530, a pH of 8.3, and an average particle size between 1 and 4 microns. The most suitable epoxy resin is the epoxy resin dispersion available from Interez, Inc., under the trade designation CMD-W-60 5520 which has a percent solids of 60±2 and a viscosity LVT No. 4 at 30 rpm of 10,000±2,000. Preferably, the film forming polymer is one that forms a film at ambient conditions upon evaporation of the volatiles from the emulsion and the aqueous chemical treating composition or from the presence of a curing agent. The amount of the oil-in-water emulsion with the film forming polymer that is present in the aqueous chemical treating composition is an amount of at least around 10 weight percent of the solids of the aqueous chemical treating composition. Generally the percent solids of the oil-in-water film forming emulsion is in the range of about 10 to about 80 weight percent.

The fortified dispersion of the matrix-polymer-compatible former is prepared by adding a nonionic surfactant such as TRITON-X100 surfactant to the oil-in-water emulsion of the film forming polymer. The amount of the nonionic surfactant added to the emulsion of the film former is generally in the range of about 5 to about 10 weight percent of the emulsion to be fortified. In addition or in lieu of the fortification by the nonionic-surfactant, the oil-in-water emulsion can be fortified with a poly(vinyl alcohol) or a silylated poly(vinyl alcohol). This is the preferred method of fortification and results in even greater shelf-life and forming efficiency for the aqueous chemical treating composition and in good physical properties for reinforced polyacetals.

Another stabilizing agent present in addition to or in lieu of the aforementioned stabilizing agent is silylated polyvinylalcohol or at least a medium molecular weight poly(vinyl alcohol). When the poly(vinyl alcohol) is present to fortify the film forming polymer emulsion, the poly(vinyl alcohol) has any molecular weight.

Such a poly(vinyl alcohol) or one for producing the silylated poly(vinyl alcohol) may have a low, medium or high molecular weight which ranges from about 22,000 to greater than 105,000 weight average molecular weight. The poly(vinyl alcohol) can be fully or partially hydrolyzed from poly(vinyl acetate). Also, mixtures of various molecular weight and hydrolyzed poly(vinyl alcohols) can be used. The poly(vinyl alcohol) can be formed from poly(vinyl acetate) by hydrolysis or ester interchange reactions, and such a starting material should be polymerized in a manner known to those skilled in the art to approach the desired molecular weight of the poly(vinyl alcohol). The poly(vinyl acetate) used as a starting material to produce the poly(vinyl alcohol) should not be such that the resulting poly(vinyl alcohol) has a high degree of crystallinity. With the increasing degrees of crystallinity, the poly(vinyl alcohol) becomes less water soluble.

The solid poly(vinyl alcohol) with a percent of hydrolysis in the range of about 87 to about 89 percent and with not too high a degree of polymerization, will be easily soluble in water. For the poly(vinyl alcohol) having a higher degree of polymerization or a higher percentage of hydrolysis, the polymer can be prepared into an aqueous emulsion by any techniques known to those skilled in the art. For example, a fully hydrolyzed poly(vinyl alcohol) that is one having about 98 to around 98.8 percent hydrolyzation is soluble only in hot to boiling water. If the fully hydrolyzed poly(vinyl alcohol) is to be combined with water at room temperature, an emulsion or dispersion of the polymer will have to be used. In forming an oil-in-water emulsion of the poly(vinyl alcohol), such solvents as acetone or normal propanol can be used to improve water stability. When the partially hydrolyzed poly(vinyl acetate) is used, the water solution of the poly(vinyl alcohol) can be prepared at room temperature and need not be in the form of an emulsion, unless higher amounts of poly(vinyl alcohol) are to be present in the solution and water would be a minor component. Generally, the poly(vinyl alcohol) will not dissolve in cold water, but it can be dissolved in warm or hot water and cooled with agitation so it does not precipitate. Some residual acetate groups on the poly(vinyl alcohol) like those present where the degree of hydrolysis is around 87-89 percent renders the poly(vinyl alcohol) more soluble in water. With further increasing of the number of acetate groups on the poly(vinyl alcohol), the solubility in water of the much less hydrolyzed polymer decreases. For example, poly(vinyl alcohol) with 30 mole percent acetate (50 percent hydrolyzed) is soluble only in a water-alcohol mixture.

A nonexclusive example of a poly(vinyl alcohol) for silylation is a low molecular weight poly(vinyl alcohol) having a weight average molecular weight from about 25,000 to about 35,000 with 1 percent residual acetate groups and less than 5 percent methyl methacrylate comonomer present to flexibilize the polymer. An example of a commercially available poly(vinyl alcohol) that can be used is Elvanol T-66 poly(vinyl alcohol) for the low molecular weight type which is available from E. I. duPont de Nemours Co. A medium molecular weight type of poly(vinyl alcohol) that is 87-89 percent hydrolyzed is Vinol 53 material, which is available from Air Products and Chemicals, Inc. This material has 11 to 13 percent residual acetate moieties and a molecular weight in the range of 77,000 to 79,000 number average molecular weight (Mn) and around 30,000 weight average molecular weight (Mw). Another useful poly(vinyl alcohol) is the Vinol 51 material from Air Products Co. This material has a molecular weight of 20,000 to 30,000 and a residual acetate level of around 5 to around 8 percent.

Nonexclusive examples of poly(vinyl alcohol) copolymers that can be used include: copolymers with vinyl acetate, unsaturated aliphatic dicarboxylic acid, dialkyl esters, acrylic acid alkyl esters and vinyl alkyl ethers, crotonic acid and olefin comonomers, maleic acid monoalkyl ester, lactone rings, methyl methacrylate and the like.

The vinyl esters which can be employed to be hydrolyzed into the poly(vinyl alcohol) polymer include vinyl acetate, vinyl propionate, vinyl formate, etc., although vinyl acetate is normally employed. Also, the poly(vinyl alcohol) resin can be produced from itaconic acid which is substantially free from its ester and anhydride forms on the one hand, and vinyl acetate as a typical species of vinyl ester on the other hand through free radical polymerization in an alcoholic solvent. These polymers are hydrolyzed under acid or alkaline conditions. Alkaline conditions are created by the use of an aqueous solution of alkali metal hydroxide and alcoholysis with a basic catalyst. Commercially methanolysis with the use of sodium methoxide or sodium hydroxide can be employed. Acid hydrolysis is not preferred since resulting carboxyl groups and side chains are liable to form lactone rings (intramolecular esters) which can interfere with the solubility of the poly(vinyl alcohol) resin.

In preparing the silylated poly(vinyl alcohol) or copolymer thereof, poly(vinyl alcohol) of any molecular weight may be used, and the solution has a weight percent solids of the poly(vinyl alcohol) polymer in the range of around 5 to around 30 weight percent. For the poly(vinyl alcohol) the degree of polymerization is usually in the range of from around 500 to 2500 so that the viscosity is in the range of about 5 to about 200 centipoise for about a 4 weight percent solution. This results in a stirable solution of the polyhydroxylated polymer for contacting with the silane reactant. If necessary, viscosity stabilizing agents can be added to the poly(vinyl alcohol) solution. Lower amounts of the poly(vinyl alcohol) may not form a film on certain surfaces and higher amounts may produce solubility problems. In addition to or in lieu of the poly(vinyl alcohol) homopolymer, a copolymer of poly(vinyl alcohol) is useful. An example of such a copolymer is the interaction product of poly (vinyl alcohol) and an organosilane.

The reactable organosilane has at least one hydrolyzed or hydrolyzable group and has the general formula of:

R″—Si—(OR′)₃ where:

R′ is hydrogen and/or alkoxy groups having 1 to 5 carbon atoms; and

R″ is an isocyanato alkyl, isocyanatoaryl or isocyanato-aralkyl group, alkyl or aryl ester, or glycidoxy alkyl, glycidoxyaryl or glycidoxyaralkyl group or an esteralkyl, aryl or aralkyl group where the alkyl has from 1 to 5 carbon atoms or one of the aforementioned material in capped form.

A suitable example of an isocyanato alkyl silane is that available from Union Carbide Corp. under the trade designation Y-9030 which has the structural formula of:

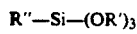

O=C=N(CH₂)₃Si(OC₂H₅)₃.

This material is a clear liquid and is greater than 95 percent active material and has a specific gravity at 25° C./25° C. of 0.99 and has an index of refraction, N<sub>D</sub>25° C. of 1.419 with a color of water-white to light amber color. This material is soluble in benzene, toluene, hexane, acetone, diethylcarbitol ®, dimethylformamide, cellosolve ® acetate. The material is stable when stored in the absence of water, alcohol, carboxylic acids, soluble heavy metals, phosphorous compounds and strong basis. Another suitable example is the material available from Union Carbide Corp. under the trade designation Y-9078 having the formula

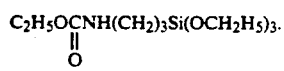

$$C_2H_5O\underset{\underset{O}{\|}}{C}NH(CH_2)_3Si(OCH_2H_5)_3.$$

When this latter material is used, longer reaction times are involved in intimately contacting the poly(vinyl alcohol) polymer so that the ethoxyl group can decompose off of the silane to result in the isocyanate functional group capable of reacting with alcohols. A suitable example of the glycidoxy material is glycidoxypropyl trimethoxysilane available under the trade designation A-187 from Union Carbide Corp. An additional epoxy-containing organosilane that is useful is that available under the trade designation A-186 and that is a beta-(3,4-epoxycyclohexyl)-ethyl-trimethoxysilane. The ester-functional organosilane is also useful and has the formula:

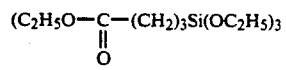

$$(C_2H_5O\underset{\underset{O}{\|}}{-C}-(CH_2)_3Si(OC_2H_5)_3$$

and is available from Union Carbide under the trade designation Y-9478.

Conducting the reaction of an isocyanate moiety with an alcohol moiety to get a urethane linked product in an aqueous medium involves careful control of the condition of the reactants such as concentration and pH of the medium and the like to favor the rate of reaction to the desired product having little or no crosslinking versus any highly crosslinked or nonlinear product. The conditions for the reaction to produce a poly(vinyl alcohol) polymer with a urethane-linked pendant silane with reactable alkoxy or hydroxy moieties involves intimately contacting the isocyanato-containing organosilane or capped isocyanate organosilane with the diluted aqueous solution of the poly(vinyl alcohol). The intimate contacting occurs with or without the presence of a catalyst and at a pH less than or equal to around 4 or greater than or equal to around 9, preferably a pH of around 4 or less, at a temperature in the range from around ambient to an elevated temperature of 100° C. or less, preferably a temperature of around ambient to 40° C., and at a pressure of subatmospheric to superatmospheric, preferably atmospheric. The reactants can be contacted in any manner as long as the diluted poly(vinyl alcohol) is used, but preferably the silane is added dropwise to the dilute poly(vinyl alcohol) aqueous solution over a period of 15 to 60 minutes. Constant agitation accompanies the intimate mixing of the reactants. At the reaction temperature of ambient temperatures including room temperature, the reaction time is in the range of around 24 hours, although the catalyzed reaction at room temperature can occur in a shorter period of time. In addition, some plasticizing materials may be Present with the poly(vinyl alcohol) such as polyethyleneglycols. The amount of the isocyanato organosilane intimately contacted with the poly(vinyl alcohol) is an effective amount to result in at least 1 and up to less than 50 percent of the poly(vinyl alcohol) having pendant hydroxyl moieties. Preferably the amount assures around 2 mole percent of the reactable organosilane is grafted to the poly(vinyl alcohol). This means that for every 98 repeating units of poly(vinyl alcohol), there are two mole percent of the isocyanato organosilane. Amounts of reactable organosilanes that result in more than 50 percent conversion of hydroxyl groups can produce gelation. The pH can be controlled with the addition of a suitable acid or base, respectively, for the pH being less than 4 or greater than 9. Preferably, the acid is a glacial acidic acid added in an amount to bring the pH to around 4. The percent yield of the silylated poly(vinyl alcohol) can be in the range of around 70 to around 90 or more percent.

The ungelled silylated polymer may be present in the aqueous solution with some unreacted poly(vinyl alcohol) and with some isocyanato-organo-functional silane that may be unreacted or reacted through another reaction mechanism. Also, in the silylated polymer itself, not all of the hydroxyl groups from the poly(vinyl alcohol) are reacted to form the pendant organo-linkage reactable organofunctional silane. For instance, the silylated poly(vinyl alcohol) can have a formula such as:

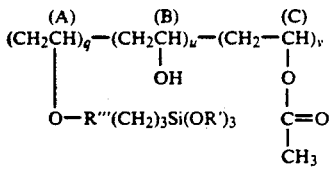

where R''' is

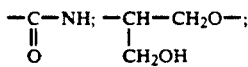

and x is 1 or 0;
where R' is a lower alkyl group having 1 to 5 carbon atoms and/or hydrogen;
where "q", "u" and "v" are integers and the numerical value of "q" is less than or equal to and preferably up to only one-half of the numerical value of ("u"+"v") and "v" is an integer reflecting the remainder percentage between 100% and the degree of hydrolyzation, and "u" is an integer reflecting the unreacted hydroxyl group. In the formula the respective positions of the three moieties A, B and C are for illustrative purposes only, and their positions relative to each other in the silylated poly(vinyl alcohol) is completely random, although known methods of producing block copolymers can be used.

When catalyzing the reaction to produce the silylated poly(vinyl alcohols), suitable catalysts for the acid catalysis include: the protic acids in general and acetic acid is particularly suitable. Also suitable are: morpholine, benzene sulfonic acid and derivatives thereof. The amount of catalyst is an effective catalytic amount to accelerate the reaction to a desired degree especially when lower reaction temperatures are used or reaction equipment is used that doesn't provide for intimate contacting like that provided by high shear stirring.

More particularly the amount may be in the range of around 0.05 to around 0.1 percent. For the basic catalysis, nonexclusive examples of the catalyst include, in general, any tertiary amine and in particular triethylamine used in an effective catalytic amount or compounds like diazobicycloundecane (DABCO).

The poly(vinyl alcohol) or silylated poly(vinyl alcohol) used in addition to a fiber lubricant as described infra or in lieu of such a lubricant, provides a stabilizing function for the azidosilane coupling agent in addition to the lubricating function. When the poly(vinyl alcohol) or silylated poly(vinyl alcohol) is present in the aqueous chemical treating composition, a fortified emulsion results. This result occurs when the silylated poly(vinyl alcohol) or polyvinyl alcohol of at least medium molecular is present with or without an oil-in-water dispersion of a film forming polymer or with or without a lubricant. The poly(vinylalcohol) and silylated poly(vinylalcohol) are present in the oil-in-water dispersion to give a fortified, stabilizing dispersion having total solids of at least around 1 weight percent where the dispersion is present in the aqueous chemical treating composition in an amount of at least 10 weight percent for a dispersion having 60 weight percent solids, and the amount of dispersion that is present in the treating composition is increased with increasing solids content of the dispersion and where the treating composition has a fiber lubricant that is essentially free of any primary or secondary nitrogen-containing moieties and is present in an effective lubricating amount. Generally, when used with the polyol type lubricants, the amount of the silylated polyvinylalcohol is greater than 10 weight percent of the solids of the aqueous chemical treating composition. Greater amounts of polyvinylalcohol than those stated above can be used to provide an equivalent lubricious function to that of a fiber lubricant and to provide a stabilizing function. Also, poly(vinyl alcohol) can be present in the aqueous chemical treating composition with a polyoxyethylene. The amount of the poly(vinyl alcohol) present in an effective film forming amount is with or without consideration of the amount of polyoxyethylene that may be present.

Another stabilizing agent present in the aqueous chemical treating composition of the present invention is the unsaturated organo compound, i.e., compound containing carbon in at least the unsaturation of a carbon to carbon double bond. Nonexclusive examples of these compounds include: the organosilane coupling agents having unsaturation in the organic moiety such as methacrylamide-containing organosilane and vinyl-containing organosilanes where the silane has alkoxy, hydroxy, acryloxy groups and unsaturation-containing organic monomers reactable with the matrix polymer or a mixture thereof. The amount of the unsaturated organo-compound present is generally around 5 percent or more of the azidosilane present in the aqueous chemical treating composition. Preferably, the amount of the unsaturated organo compound is in the range of about 4 to 15 weight percent of the solids of the aqueous chemical treating composition. Amounts greater or less than the preferred range can be used, but few further additional benefits are achieved. Other suitable unsaturated organo-compounds for the aqueous chemical treating composition include methacryloxypropyltrimethoxysilane available under the trade designation of A-174 from Union Carbide Corp. and B-(N-vinylbenzylamino)ethyl-gamma-aminopropyltrimthoxysilane monohydrogen chloride available under the trade designation Z6032 from Dow Corning Corp. The most suitable unsaturated organosilane is the cationic methacrylamidefunctional silane available under the trade designation Y-5823 from Union Carbide Corp. and having a chemical formula:

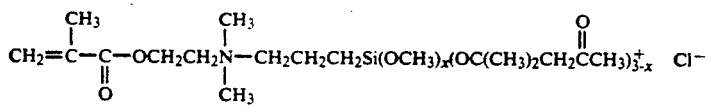

This material is soluble in methanol, ethanol, acetone, toluene, benzene, methyl cellosolve and in water. Generally, the material is available commercially as a liquid having 50 percent active ingredients in diacetone alcohol and has a specific gravity at 25° C./25° C. of 0.998 and it is diluted with water or alcohol.

The aqueous chemical treating composition in addition to the silyl azide and one or more stabilizing agents can also have present a lubricant which is free of any primary or secondary nitrogen containing moieties and which is present in an effective lubricating amount. Suitable lubricants include film forming polymers which also have a lubricious function or polyol type lubricants. A suitable polyol lubricant is available under the trade designation POLYOX WSR 301. Generally, the preferred amount of the polyol type lubricant is in the range of about 0.1 to about 0.6 percent of the solids of the aqueous chemical treating composition. Amounts of other types of lubricants are equivalent to the lubricious performance of the aforedescribed range of the polyol lubricants.

The polyoxyethylene polymer that can be present on the glass fibers is a water soluble, dispersible or emulsifiable polyoxyethylene polymer with an effective film forming molecular weight of at least 100,000 Mv measured by the viscosity of an aqueous solution by any method known in the art. The upper limit of the molecular weight for the polyoxyethylene polymer is a practical limitation regarding the solubility, dispersibility or emulsifiability of the polyoxyethylene polymer in aqueous solutions. Preferably, the molecular weight ranges from around 600,000 to 4,000,000 Mw and most preferably around 900,000 Mw. The upper limits of the molecular weight has a practical limitation due to the increase in viscosity of the aqueous chemical treating composition resulting from the use of higher molecular weight polyoxyethylene polymers. In treating glass fibers during their formation with the aqueous chemical treating composition, the aqueous chemical treating composition should not have a viscosity of much greater than 150 preferably 50 centipoise at room temperature. When the chemical treating composition is a gel rather than a solution, the treating composition can have a higher viscosity and a higher molecular weight polyoxyethylene polymer can be used. The glass transition temperature of the polyoxyethylene polymer should be less than about $-20°$ C. and preferably is around $-50°$ to $-70°$ C. for molecular weights exceeding 100,000. When the molecular weight of the polyoxyethylene polymer is less than around 100,000 Mv and it is used in an aqueous chemical treating composition, additional components should be added to the aqueous chemical treating composition. These components would produce a coalesced and integral film from the aqueous chemical treating composition upon moisture reduction and would reduce any plasticizing effect of the other components in the composition. Any additional component known to those skilled in the art for accomplishing these purposes can be used.

A suitable polyoxyethylene polymer which can be used is available from Union Carbide under the trade designation POLYOX resins designated as WSR-1105 having a molecular weight of 900,000 or WSR-205 having a molecular weight of 600,000 or the WSRN-3,000 having a molecular weight of 400,000. The solution viscosity can be determined at 25° C. with a No. 1 spindle at 50 rpm. The POLYOX material is a water soluble resin which is nonionic and thermoplastic and it has a common structure of: $(-O-CH_2CH_2)_n$ where the degree of polymerization, $n$, varies from about 2,000 to about 100,000. With the repeating unit having a molecular weight of 44, the polymer has a corresponding molecular weight in the range of about 100,000 to about 5,000,000 Mn. These materials are solids at room temperature, and they can have either a broad or narrow distribution of molecular weights. Their appearance is a white powder with a particle size in percent by weight through a No. 20 USBS sieve of 98 minimum, and they have: a melting point (crystal x-ray) of 65° C.; a volatiles content, as supplied by percent by weight of less than 1; an alkaline earth metals percent by weight of calcium oxide of 0.5; a powder bulk density of 24 pounds per cubic feet (117.2 kg/m$^2$); and a solution pH of 7-10. The amount of the polyoxyethylene polymer present in the aqueous chemical treating composition for treating the glass fibers of the present invention is an amount greater than around 0.3 weight percent solids of the aqueous chemical treating composition. The upper limit of the amount in the aqueous chemical treating composition is that amount which does not increase the viscosity above around 150 centipoise at 25° C. In addition, the polyoxyethylene polymer can be a polyoxyethylene homopolymer or can have very minor amounts of polyoxypropylene repeating units. The polyoxyethylene polymer can be dispersed in water by any method known to those skilled in the art.

The aqueous chemical treating composition can have at least one water-soluble, ungelled polymer having an effective viscosity to result in a viscosity for the aqueous chemical treating composition of at least 5 centipoise. Also, the ungelled polymer has a capability of forming a film at a temperature below ambient temperature and has an effective molecular weight of at least 100,000 and up to 6,000,000. It is preferred for obtaining the better integrity of the strand in the wet state for wet chopping that the Tg (glass transition temperature) of the film forming polymer is equal to or greater than ambient temperature. Also, it is preferred that the polymer is capable of forming a film at a temperature below ambient temperature. This characteristic is determined by the test for "Minimum Film Formation Temperature of Emulsion Vehicles" which is the test from the American Society of Testing Materials (ASTM) No. 2358-68.

Non-exclusive examples of the water-soluble, ungelled polymer include the polyoxyethylene polymer, as aforementioned, and includes the polymers having Tg's as determined by nuclear magnetic resonance (NMR), or any relative Tg determination method at or above ambient temperature, such as polyacrylic acid neutralized with base, polyacrylamides, polyvinylpyrrolidone, and polyvinyl alcohol, and blends and mixtures thereof. These latter materials preferably have effective molecular weights of 1,000,000 or greater. The polyacrylic acid has its functional groups neutralized with ammonium hydroxide. The ammonium hydroxide is present in the aqueous chemical treating composition in an amount of around 0.1 to 0.5 weight percent. The amount of the water-soluble ungelled polymer present in the aqueous chemical treating composition generally ranges from about 0.5 weight percent of the non-aqueous component up to greater than 30 weight percent. The higher Tg polymers can be used in combination with other additives, such as at least one or more organofunctional silane coupling agent, at least one additional film forming polymer and at least one fiber lubricant. Other components that can be present are waxy substances and the polyoxyethylene. When using a lower Tg water-soluble, ungelled polymer, there is preferably used in conjunction with it a higher Tg water-soluble, ungelled polymer or the low Tg polymer has a very high effective molecular weight. In addition, the presence of a film forming polymer which forms a film at ambient conditions having a high enough Tg to allow for this and the presence of the high molecular weight polyol assist in producing chemically treated fibers in a wet chop process. Therefore, the function of the high molecular weight, polyol lubricant and the film forming polymer that forms a film at ambient conditions, is not only their lubricating and film forming functions respectively, but also their assistance in producing a wet chop product.

Another additional component that can be present in the aqueous chemical treating composition is a suitable curing agent for the film forming polymer. Examples of suitable curing agents include: acid catalysts for epoxy resins and polyurethane coreacting catalysts, but generally, the amine and anhydride catalysts are not used. A suitable example of a usable catalyst is the morpholine salt in paratoluene sulfonic acid. The amount of the acid used is generally in the range of about 0.1 to 0.5 percent to cause curing of the film forming polymer at ambient conditions.

The aqueous chemical treating composition also has water in a sufficient amount to give a total solids (nonaqueous content) in the range of about 5 to about 30 weight percent and preferably 5 to about 15 weight percent. In any event, the amount of various components and the amount of water should be balanced so hat the viscosity of the solution is not greater than around 150 centipoise at 20° C. Solutions having viscosities greater than 150 centipoise are difficult to apply to the fibers especially glass fibers during their formation with standard type application equipment without breaking the continuity of the fibers. It is preferred that the viscosity of the aqueous chemical treating composition for a wet chop process be in the range of around 20 to 60 centipoise at 20° C. for best results. If the aqueous chemical treating composition is prepared with thixotropic agents to make it a foam or gel, then the viscosity will be that appropriate to such products and the applicating equipment will be appropriate for applying foams and gels to glass fibers.

The aqueous chemical treating composition is prepared by addition of any of the components simultaneously or sequentially to each other except that the azidosilane is not added before at least one of the stabilizing agents such as the fortified film forming emulsion or the water soluble silylated or medium molecular weight poly(vinyl alcohol) polymer. It is preferred to predilute all of the components before they are added together and combined with water.

The fibers that are treated with the aqueous chemical treating composition are the high modulus fibers such as carbon fibers and polyaramid fibers and glass fibers. Suitable examples of glass fibers include "E-Glass" or "621-" glass fibers and low or free boron or fluorine derivatives thereof. The aqueous chemical treating composition is applied to the fibers, preferably in the forming operation in a wet chop operation. In applying the aqueous chemical treating composition to the fibers during the formation of the fibers the treating composition has good stability for three days to withstand high shear necessary to keep the treating composition in an emulsion or dispersion form. In the wet chop forming operation the glass fibers are pulled from a glass batch melting furnace through orifices in a bushing, and the fibers are treated with the aqueous chemical treating composition and then combined into one or more strands which are chopped and collected. The chopped fibers can be collected as dried fibers or can be collected as wet chop fibers and transported to a drying area for drying. The amount of the aqueous chemical treating composition on the fibers is generally in the range of about 0.1 to about 1.5 percent LOI (loss on ignition). The moisture level of the aqueous chemical treating composition is maintained around less than 14 weight percent, preferably not less than 10 weight percent. The glass fiber strands in wet chopping are usually of a chopped length ranging from around less than 1/16" to greater than 2" but preferably in the range of about ⅛ to around 3/16". The chopped glass fiber strands are dried to remove residual moisture and to adequately cure any curable film forming polymer. If the moisture content is greater than 14 weight percent and the LOI level is increased to above the middle or upper region of the range to avoid excess filamentation of the chopped fibers.

Not only do reinforcing fibers benefit from treatment with the aforementioned chemical treating composition, but also inorganic fillers sometimes used in reinforced composites may benefit from such treatment. Nonexclusive examples of such inorganic fillers include mica, wollastonite, talc, clay and novaculite. Contacting the fillers with the aqueous chemical treating composition by spraying or dipping or the like is a convenient way of treating them.

When the aqueous chemical treating composition is applied to the fibers, the fibers can be dried in such a manner to avoid formation of undesirable colors. So the drying temperatures should not be too high to produce non-white colors from the heat sensitive components of the aqueous chemical treating composition. Upon drying, a moisture-reduced residue is formed on the fibers and these fibers are useful in reinforcing thermoplastic polymers such as polyacetals including homopolymers and copolymers and polyphenylenesulfides. Generally drying of the fibers occurs any ti TM * before the fibers contact the matrix polymer. Preferably, the temperature of drying the chemically treated fibers to produce the moisture-reduced residue is in the range of around less than 350° F. (177° C.) with lower temperatures requiring longer drying times.

The acetal polymers are prepared by polymerizing formaldehyde gas in the presence of a comonomer such as ethylene or propylene oxide. The acetal polymers possess a high degree of lubricity, but their chemical structure requires processing temperatures below 450° F. (232° C.) or the acetal may decompose back to formaldehyde gas. The chemically treated reinforcing fibers of the present invention are ideally suited for reinforcing the polyacetals, and with the presence of at least the unsaturated organo compound stabilizing agent, the fibers assist in limiting excessive weight loss due to degradation of the acetal in producing the fiber reinforced acetals. Polyphenylenesulfide is a much more thermally stable polymer, and the chemically treated reinforcing fibers of the present invention, without the presence of the poly (vinyl alcohol) or silylated poly(vinyl alcohol) in the residue, allow for production of fiber reinforced polyphenylenesulfide. This reinforced product is not hampered in its thermal stability by any chemical treatment on the reinforcing of the fibers. Thus the fiber reinforced polyphenylenesulfide (PPS) can come close to the full thermal stability and potential of the PPS by using the reinforcing fibers of the present invention. In preparing fiber reinforced acetals or polyphenylenesulfide with the chemically treated fibers of the present invention, the dried fibers prepared in a wet chop or dry chop operation, preferably a wet chop operation, can be used in extrusion injection, compression or bulk molding compounds or the like. Preferably, the chopped glass fiber strands are mixed with the matrix polymer resin in an extruder to produce a ribbon of reinforced matrix polymer which is chopped into pellets. The pellets are used in an injection molder in producing the fiber reinforced polymeric part or shaped device. Formation of pellets occurs at a temperature that does not degrade the acetal and that is sufficient to melt the acetal or polyphenylenesulfide to produce the ribbon.

PREFERRED EMBODIMENT

In the preferred embodiment the reinforcing fibers are glass fibers formed in a wet chop operation to produce chemically treated glass fibers having a length around ⅛" to 3/16". The fibers have conventional filament diameters but are preferably of a diameter in the range of around 10 to 16 microns. The aqueous chemical treating composition preferably has the formulation with ranges of amounts and most preferred amounts for the components as shown in Table A.

TABLE A

| | Per 100 Gallons |
|---|---|
| epoxy polymer dispersion | 20 to 50 |
| celanese CMD W60-5520 | 34 lbs. |
| silylated poly(vinyl alcohol) | 60 to 90 |
| in aqueous solution | 75.85 lbs. |
| azide coupling agent | 30 to 50 |
| Hercules AzCup N agent | 41.1 lbs. |
| cationic methacrylamide functional silane | 5 to 15 |
| Union Carbide's Y-5823 | 10 lbs. |
| polyoxyethylene polymer | 0.10 to 0.40 |
| Polyox WSR-301 | 0.22 lb. |
| water | 80 to 120 |
| solids | 7.7 to 8.5 |
| pH | 5.8 to 6.2 |
| temperature | 75° F. to 95° F. (24° C. to 35° C.) |
| viscosity Brookfield (LVT No. 1 30 RPM) cps at 78° F. (25° C.) | 4 to 6 |

In addition to the aforementioned functions of the water soluble polymer, that is, the poly(vinyl alcohol) or the silylated poly(vinyl alcohol), another function is the production of handleable chemically treated glass fibers. Some of the commercially available azidosilanes are prepared with tetraethyl orthosilicate as mentioned in their material safety data handling sheets. With the proper amount of the water soluble polymer the brittle handling characteristics engendered in the chemically treated glass fibers with tetraethyl orthosilicate are reduced. The physical properties of the glass-reinforced polyacetals are also substantially increased when the chemically treated glass fibers are coated with such poly(vinyl alcohol) polymers.

The aqueous chemical treating composition is prepared preferably in a manner to give a moisture content of less than 14 percent before chopping the wet fibers. After chopping in a wet condition, the fibers are conveyed to a Rexnord drying device and preferably dried at a temperature in the range of around 270° to 290° F. to produce a chopped fiber with a white color.

The chopped fibers are then prepared into injection molding pellets with polyacetal or polyphenylene sulfide resins although other thermoplastic polymers can be reinforced with the chemically treated glass fibers, then are dried to a moisture content of around less than 0.0093. The amount of the fibers that can reinforce the thermoplastic polymers is in the range of about 5 to 50.

The aqueous chemical treating composition is prepared by adding about ¼ of the total volume of water to a main mix tank where the water is deionized water at ambient temperatures, and added to this is the silylated poly(vinyl alcohol) with stirring. Subsequently added is the epoxy polymer oil-in-water dispersion with stirring. To a premix vessel, around 4 percent of the volume of the total water is added, and the polyoxyethylene is added to this amount of water in the premix vessel with vigorous stirring. About 8 percent of the total volume of water is added to the mixture of polyoxyethylene and water where the water is at a temperature of around 150° F. and stirred for 10 minutes and then transferred to the main mix vessel. The azide coupling agent is added to the main mix vessel with stirring. The cationic methacrylamide function silane is added to the main mix vessel, and the total mixture is diluted to the final volume with deionized water at ambient temperature, and the entire mixture is stirred for around 10 minutes.

The chemically treated glass fibers have an LOI in a range of around 0.6 to 1.2 and a percent moisture of around 0.09 percent. The filamentation of the chemically treated glass fibers with a dried residue is around 5.3 percent for 6 minutes of agitation. The funnel flow of a 20 pound sample is around 19 seconds and the bulk density of an untapped sample is around 33.4 pounds per cubic foot. In the order of addition, the azidosilane is not added to the main mix vessel before the epoxy resin dispersion, but other than that, the order of addition is not critical. The best performance of the aqueous chemical treatment requires continuous stirring. Preferably, the chemically treated glass fibers are chopped into lengths of 3/16".

EXAMPLES

Illustrative Example

In formulating an oil-in-water emulsion of the azidosilanes that are commercially available, the initial endeavor involved mixing a nonionic surfactant, commercially available as TRITON X-100 surfactant, in an amount of 75.2 grams with 832.4 grams of the azidosilane in an Eppenbach mixer with the mixing plate up. Slowly deionized water was added as the plate was lowered and the rpm was increased on the Variac to a setting of approximately 75. The emulsion broke at approximately 500 to 600 milliliters of additional deionized water. An additional 7,500 milliliters of water were added which resulted in a pH of around 3.3 to 3.5. The mixture was allowed to stir for 24 hours and a 500 ml sample was adjusted to a pH of 7, but within 5 minutes, the mixture gelled.

Table I presents components of the aqueous chemical treating composition in weight percent of solids where the sizing formulations were prepared in a manner similar to that of the preferred embodiment. Where components of the preferred embodiment are not present in the formulations of Table I, they just were not added at the time they were added in the procedure of the preferred embodiment.

in reinforcing thermoplastic polymers. The bulk density test measures a slip flow characteristic in relation to compaction of chopped glass fiber strands. Compaction comes into play in molding reinforced thermoplastic materials. Bulk density is measured by filling a test tube with a known volume of chopped glass fiber strands. The test tube is placed on a shaker, and the volume occupied by the strands after shaking is recorded. Higher volumes indicate better bulk density. The final flow test is conducted by placing a given quantity of chopped glass fiber strands either dry chopped or dried wet chopped in a funnel equipped for vibration. The time it takes the total weight of the strands to pass through the funnel is recorded. Lower times in this test indicate better flow which is the better result. The PDI04 filamentation test is conducted with a weight portion of dried glass fibers and a weighed amount of crushed walnut shells. All three materials are placed in a metal can and shaken on a paint shaker for 3 to 6 minutes. The walnut shells and intact glass fibers are

TABLE 1

|  | Solid Level | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
|  |  |  |  |  |  |  |  | Weight Percent Solids |  |  |  |  |  |  |  |  |  |
| azido-containing organo-silane (Az Cup N) | 0.62 | 36.4 | 36.4 | 36.4 | 36.4 | 36.4 | 36.4 | 36.4 | 45.5 | 45.5 | 45.5 | 45.5 | 45.5 | 45.5 | 45.5 | 36.4 | 36.4 |
| polyvinylalcohol |  |  |  |  |  |  |  |  |  |  |  |  |  |  |  |  |  |
| Vinol WS-51 | 1.00 |  |  |  |  | 20.2 | — | — |  |  |  |  |  |  |  |  |  |
| Vinol WS-53 |  |  |  |  |  |  |  | 20.2 |  |  |  |  |  |  |  |  |  |
| silylated polyvinyl alcohol | — | 30.3 | 30.3 | 20.2 | 10.1 | — | 21.0 | — | 10.1 | 20.2 | 30.3 | 30.3 | 20.2 | 10.1 | 21.0 | 10.1 | 20.2 |
| polyacrylic resin | — | — | — | — | — | — | — | — | — | — | — | — | — | — | — | — | — |
| Rhoplex AC-33 |  |  |  |  |  |  |  |  |  |  |  |  |  |  |  |  |  |  |
| E-693 |  |  |  |  |  |  |  |  |  |  |  |  |  |  |  |  |  |  |
| aqueous epoxy emulsion |  |  |  |  |  |  |  |  |  |  |  |  |  |  |  |  |  |  |
| CMD-W60-5520 | 0.60 | 32.8 | — | — | — | 42.9 | 21.0 | 42.9 | — | — | — | — | — | — | — | 53.0 | — |
| CMD-35201 | — | — | 32.8 | 42.9 | 53.0 | — | — | — | 32.8 | 42.9 | 53.0 | 21.0 | 42.9 | 53.0 | 21.0 | — | 42.9 |
| Syntex 3981 acid catalyst | 1.0 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| polyoxyalkylene polyol (Polyox WSR301) | 1.0 | 0.7 | 0.7 | 0.7 | 0.7 | 0.7 | 0.7 | 0.7 | 0.5 | 0.5 | 0.5 | 0.5 | 0.7 | 0.7 | 0.7 | 0.7 | 0.7 |
| Solids |  | 7.3 | 7.0 | 6.9 | 7.2 | 6.5 | 7.4 | 5.7 | 10.1 | 6.5 | 9.6 | 8.0 | 8.0 | 7.3 | 8.2 | 7.4 | 7.3 |
| pH |  |  |  |  |  |  |  |  |  |  |  |  |  |  |  |  |  |  |

|  | Solid Level | 17 | 18 | 19 | 20 | 21 | 22 | 23 | 24 | 25 | 26 | 27 |
|---|---|---|---|---|---|---|---|---|---|---|---|---|
|  |  |  |  |  |  | Weight Percent Solids |  |  |  |  |  |  |
| azido-containing organo-silane (Az Cup N) | 0.62 | 54.5 | 54.5 | 54.5 | 54.5 | 54.5 | 54.5 | 54.5 | 45.5 | 35.9 | 30.8 | 30.8 |
| polyvinylalcohol |  |  |  |  |  |  |  |  |  |  |  |  |
| Vinol WS-51 |  | — | — | — | — | — | — | — | — | — | — | — |
| Vinol WS-53 | 1.00 |  |  |  |  |  |  |  |  |  |  |  |
| silylated polyvinyl alcohol | — | 10.0 | 20.2 | 30.3 | 30.3 | 20.2 | 10.1 | 21.0 | 21.0 | — | 29.4 | — |
| gamma methacryloxypropyl-trimethoxysilane | — |  |  |  |  |  |  |  |  | 5.3 |  |  |
| polyacrylic resin |  |  |  |  |  |  |  |  |  |  |  |  |
| Rhoplex AC-33 |  | — | — | — | — | — | — | — | — | 30.6 |  |  |
| Y-5823 |  |  |  |  |  |  |  |  |  |  | 7.8 | 7.8 |
| aqueous epoxy emulsion |  |  |  |  |  |  |  |  |  |  |  |  |
| CMD-W60-5520 | 0.60 | 53.0 | 42.9 | 32.8 | — | — | — | — | — | 27.8 | 31.6 | 31.6 |
| CMD-35201 | — | 0 | 0 | 0 | 32.8 | 42.9 | 53.0 | 21.0 | 21.0 | — | — |  |
| Syntex 3981 acid catalyst | 1.0 | 0.4 | 0.4 | 0.4 | 0.4 | 0.4 | 0.4 | 0.4 | 0.4 |  | — | — |
| polyoxyalkylene polyol |  |  |  |  |  |  |  |  |  |  |  |  |
| (Polyox WSR301) | 1.0 | 0.7 | 0.7 | 0.7 | 0.7 | 0.7 | 0.7 | 0.7 | 0.7 | 0.4 | 0.03 | 0.03 |
| Acetic Acid | — |  |  |  |  |  |  |  |  |  |  |  |
| Solids |  | 8.2 | 8.4 | 9.1 | 7.9 | 7.0 | 8.0 | 8.0 |  | — | 8.1 | 8.1 |

The formulations of Table 1 were applied to glass fibers in a wet chop operation where the fibers were K fibers and the LOIs of the dried residue of the aqueous chemical treating composition on the fibers along with performance testing of the dried fibers is given in Table 2. Also in Table 2 are results of testing of the dried fibers separated from the resultant mixture and fuzz balls, if any, by passing through screens. The fuzz balls are weighed, and a ratio of the fuzz weight to the starting glass fiber weight yields a percent filamentation at a specified time (in minutes) of shaking.

TABLE 2

| | Direct Injection Molding Data | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| | Weight Percent Solids | | | | | | | | | | | | | | | |
| LOI | 1.13 | 1.39 | 1.02 | 0.89 | 0.66 | 1.14 | 0.79 | 1.06 | 1.25 | 1.53 | 1.54 | 1.05 | 1.10 | 1.34 | 0.93 | 1.06 |
| H₂O | 16.1 | 17.5 | 14.3 | 15.8 | 12.3 | 16.9 | 14.3 | 16.7 | 16.9 | 20.1 | 18.9 | 16.0 | 15.3 | 16.1 | 13.8 | 16.4 |
| 20 lb. funnel flow | 0.30 | 0.23 | 0.19 | 0.43 | 10.2 | 0.22 | 0.42 | 0.50 | 0.35 | 1.01 | 0.36 | 0.20 | 0.20 | 0.21 | 0.31 | 0.27 |
| Pd 104 6 min. | 32 | 18 | 48 | 80 | 98 | 42 | 99 | 58 | 30 | 9 | 14 | 35 | 60 | 39 | 85 | 39 |
| Bulk density | | | | | | | | | | | | | | | | |
| Tensile Strength (regrind) ×10³ | 16.7 | 15.2 | 17.0 | 16.9 | 16.3 | 16.4 | 16.8 | 17.1 | 17.3 | 17.4 | 15.7 | 15.5 | 15.5 | 15.9 | 16.7 | 16.0 |
| Glass Content | 24.1 | 24.0 | 24.5 | 24.2 | 22.3 | 24.2 | 24.6 | 27.2 | 24.7 | 24.1 | 24.1 | 24.5 | 24.4 | 24.2 | 18.1 | 23.5 |
| Molded 5/15/16/86 Tensile Strength (Direct) ×10³ | 18.5 | 18.8 | 18.5 | 18.4 | 16.7 | 17.6 | 18.1 | 18.5 | 19.2 | 19.4 | 9.2 | 18.7 | 18.3 | 19.7 | 16.5 | 18.4 |
| Glass % | 23.2 | 24.5 | 24.6 | 24.4 | 22.2 | 24.3 | 24.5 | 24.7 | 24.2 | 24.5 | 24.6 | 24.4 | 24.5 | 23.5 | 22.3 | 23.1 |
| In Delrin 500 acetal | | | | | | | | | | | | | | | | |
| Direct Tensile | | | | | | | | | | 18.7 | | | | 17.8 | | |
| Glass content | | | | | | | | | | 24.6 | | | | 24.4 | | |
| Regrind Tensile | | | | | | | | | | 16.2 | | | | 14.5 | | |
| Glass Content | | | | | | | | | | 23.5 | | | | 21.3 | | |

| | 17 | 18 | 19 | 20 | 21 | 22 | 23 | 24 | 25 | 26 | 27 |
|---|---|---|---|---|---|---|---|---|---|---|---|
| | Weight Percent Solids | | | | | | | | | | |
| LOI | 1.13 | 1.52 | 1.94 | 1.64 | 1.46 | 0.99 | 1.55 | — | | — | |
| H₂O | 16.4 | 18.2 | 21.0 | 18.4 | 18.4 | 15.2 | 17.8 | — | | — | |
| 20 lb. funnel flow | 0.25 | 0.23 | 0.42 | 0.51 | 0.25 | 0.30 | 0.45 | — | | 32 sec. | 180 sec. |
| Pd 104 6 min. filamentation | 89 | 54 | 26 | 17 | 46 | 88 | 57 | — | | 5.7% | 68% |
| Bulk density pcf. | | | | | | | | | | 39 | 22 |
| Tensile strength (regrind) | 15.2 | 16.1 | 16.4 | 15.5 | 16.6 | 14.3 | 15.9 | — | | | |
| Glass Content | 24.9 | 22.9 | 22.7 | 24.0 | 25.0 | 23.7 | 24.6 | — | | | |
| Tensile Molded 5/15/16/86 Direct | 18.6 | 17.8 | 17.4 | 17.6 | 18.6 | — | 18.2 | — | | 18.2(c) | 18.5 |
| | | | | | | | | | | 19.4(c) | |
| | | | | | | | | | | 21.9(d) | |
| | | | | | | | | | | 19.1(d) | |
| | | | | | | | | | | 19.6 | |
| Glass | 24.6 | 18.9 | 17.9 | 22.3 | 24.9 | — | 22.9 | — | | 25.0 | 25.0 |
| Acetal 1 (Celcon M9-04²) | | | | | | | | | | | |
| Flexural Strength (psi) | | | | | | | | | 18.2 | 27.1 | 26.0 | 24.9 |
| Flexural Modulus (mmpsi) | | | | | | | | | 0.81 | 1.03 | 1.2 | 1.1 |
| Izod ft. lb./in (N) | | | | | | | | | 0.84 | 1.74 | 13.5 | 1.5(a) |
| | | | | | | | | | | | 1.3N |
| Acetal 2 (Deldrin 500 NC-10¹) | | | | | | | | | | | |
| Flexural Strength (psi) | | | | | | | | | 18.2 | 30.2 | 28.0 | 32.3 | — |
| Flexural Modules MMpsi | | | | | | | | | 0.95 | 1.23 | 1.2 | 1.26 | — |
| Izod ft. lb./in. | | | | | | | | | 0.94 | 1.73 | — | 2.0 | — |

¹Available from E. I. duPont de Nemours Co., Inc.
²Available from Celanese Engineering Resins, Inc.

Table 2 shows the achievement of good processability and funnel flow and filamentation of the moisture-reduced chemically treated glass fibers of the present invention and the good strength properties of polyacetal polymer reinforced with the chemically treated glass fibers of the present invention.

A number of aqueous chemical treating compositions were prepared having in weight percent: 37.7 azido-containing silane, 25.2 silylated polyvinyl alcohol, 27.1 aqueous epoxy polymer (CMD-W60-5520) 0.78, acid catalyst (Syntex 3981), 0.47 polyoxy alkylene polyol 0.47, along with varying amounts and kinds of unsaturated organofunctional coupling agents. These are shown in Table 3 along with performance data of polyacetals reinforced with glass fibers treated with the chemical treatment. Table 3 shows a lowering of weight loss of the matrix polymer reinforced with the chemically treated glass fibers of the present invention where the chemical treatment has an unsaturated organic material.

TABLE 3

| | Compound Extrusion Data in Poly-Acetal¹ | | | | | | | | |
|---|---|---|---|---|---|---|---|---|---|
| | 37 | 38 | 39 | 40 | 41 | 42 | 43 | 44 | 45 |
| N-B-(N-vinylbenzyl-amino)ethyl-v-amino-propyltrimethoxy silane monohydrogen chloride-Z6032- 40% silane in methanol | — | 7.6 | 19 | — | — | — | — | — | — |
| cationic methacrylato functional silane | — | — | — | 7.6 | 19 | — | — | — | — |
| gamma methacryloxypropyltrimethoxy silane | — | — | — | — | — | 7.6 | 19 | — | — |
| Wt. Loss (500° F.) (%/min.) Delrin (45 min) | 0.29 | 0.09 | 0.1 | 1.09 | 0.08 | 0.08 | 0.08 | 0.09 | 0.10 |
| PD104 (6 min.) | 22.2 | 47.2 | 18.0 | 5.7 | 8.8 | 20.0 | 59.0 | 8.7 | 4.7 |
| Cov | 4.7 | 10.3 | 4.1 | 4.5 | 6.6 | | — | 6.3 | |
| N. Izod | 1.83 | 1.84 | 2.03 | 1.95 | 1.62 | | | — | 1.70 |
| Funnel Flow | 19.2 | 19.1 | 23.4 | 18.8 | 19.6 | 43.0 | 2.46 | 56.4 | 32.1 |
| Tensile Strength | 20.3 | 20.8 | 20.9 | 21.5 | 21.0 | 19.0 | 17.4 | 19.3 | 19.5 |

TABLE 3-continued

| Compound Extrusion Data in Poly-Acetal[1] | | | | | | | | |
|---|---|---|---|---|---|---|---|---|
| | 37 | 38 | 39 | 40 | 41 | 42 | 43 | 44 | 45 |
| % Glass | 24.2 | 24.6 | 24.7 | 24.6 | 24.7 | 24.9 | 24.0 | 27.3 | 24.9 |
| % Elongation | 4.7 | 4.8 | 4.7 | 4.9 | 4.8 | 4.0 | 3.6 | 4.2 | 4.4 |
| LOI Actual | 1.53 | 1.12 | 1.30 | 1.33 | 1.38 | 1.19 | 1.42 | 1.26 | 1.31 |

[1]Polyacetal available from under the trade designation Deldrin 500 polymer.

I claim:

1. Chemically treated high modulus fiber having thereon an aqueous chemical treating composition, comprising:
   a. water soluble, silylazide in an effective coupling agent amount,
   b. at least one stabilizing agent selected from the group consisting of: 1) fortified oil-in-water dispersion of a matrix-compatible film forming polymer; 2) silylated poly(vinyl alcohol) and copolymers; 3) at least medium molecular weight poly(vinyl alcohol) and copolymers, having a weight average molecular weight of around 30,000 to 105,000; and 4) unsaturated organo-compounds selected from the group consisting of methacrylamide-containing organosilane, vinyl-containing organosilanes, methacryloxypropyltrimethoxysilane, b-(N-vinylbenzyl-amino)ethyl-gamma-aminopropyltrimethoxysilane monohydrogen chloride; where the silane has groups selected from groups consisting of: alkoxy, hydroxy, acryloxy groups and a mixture thereof; and unsaturation-containing organic monomers reactable with the matrix polymer; and mixtures thereof,
   c. fiber lubricant essentially free of any primary or secondary nitrogen containing moieties and present in an effective lubricating amount, and
   d. water to given an effective total solids and viscosity for the treating composition for application to the fibers, where the amount of the chemical treating composition on the fiber is in the range of about 0.1 to about 1.5 percent LOI.

2. Chemically treated fiber of claim 1, wherein the aqueous chemical treating composition is present as a moisture-reduced residue.

3. Chemically treated fiber having an aqueous chemical treating composition, comprising:
   a. water soluble silylazide in an effective coupling agent amount,
   b. fiber lubricant essentially free of any primary or secondary nitrogen containing moieties and present in an effective lubricating amount, and
   c. film forming polymer added as an oil-in-water dispersion or in an aqueous solution or as a water soluble solid where the polymer forms a film through evaportion of volatiles or through curing and where the film forming polymer is present in an amount of around at least 10 weight percent of the solids of the aqueous chemical treating composition and where the polymer is essentially free of any primary or secondary nitrogen containing moieties,
   d. unsaturated organo-compound present in an effective amount to stabilize against degradation of the matrix polymer reinforced by the chemically treated fibers where the degradation is from silyl azide derivatives or additives,
   e. water to give an effective total solids and viscosity for the treating composition for application to the fibers.

4. Chemically treated fiber of claim 3, wherein the aqueous chemical treating composition is present as a moisture-reduced residue.

5. Chemically treated fiber of claim 3, wherein in the aqueous chemical treating composition the film forming polymer is added as a fortified oil-in-water dispersion of the matrix-compatible film former and is fortified by the presence of at least one compound selected from the group consisting of: an effective amount of nonionic emulsifier to allow the addition of silylazide to the dispersion while generally maintaining integral droplets in the dispersion where the droplets can generally swell without bursting; a water soluble polymer selected from the group consisting of: poly(vinyl alcohol) and copolymers and silylated poly(vinyl alcohol) and copolymers, where the fortifying compounds is present in the oil-in-water dispersion to give the fortified, stabilizing dispersion having a total solids of 1 to 80 weight percent, and where the dispersion is present in the aqueous chemical treating composition in an amount of at least 10 weight percent for a dispersion having 60 weight percent solids.

6. Chemically treated fiber of claim 4, wherein the film forming polymer in the aqueous chemical treating composition is a water soluble polymer selected from the group consisting of at least medium molecular weight poly(vinyl alcohol), silylated poly(vinyl alcohol) or mixture thereof present in water.

7. Fiber of claim 1, wherein the fortified oil-in-water dispersion with the film forming polymer is fortified by the presence of at least one of the compounds selected from the group consisting of: i) an effective amount of nonionic surfactant to allow the addition of silylazide to the dispersion while generally maintaining integral fortified droplets in the dispersion where the droplets can generally swell without breaking, ii) silylated poly(vinyl alcohol) and copolymers, and poly(vinyl alcohol) and copolymers.

8. Fiber of claim 3, wherein the aqueous chemical treating composition has a polyoxyethylene polyol with a molecular weight in the range of around at least 100,000 to 4,000,000 in an effective amount to increase the viscosity of the aqueous chemical treating composition to a range of 20 cps to 80 cps.

9. Fiber of claim 4, wherein the film forming polymer forms a film around ambient conditions.

10. Fiber of claim 8, wherein the film forming polymer forms a film around ambient conditions.

11. Fiber of claim 4, wherein the fiber is selected from the group consisting of glass, carbon and aromatic polyamides.

12. Fiber of claim 8, wherein the film forming polymer is selected from the group consisting of an epoxy homopolymer or copolymer including epoxy polyurethane copolymers, and bisphenol A thermoplastic polyesters.

13. Chemically treated high modulus fibers having thereon a moisture reduced residue of an aqueous chemical treating composition, comprising:
   a. water soluble silylazide in an effective coupling agent amount,
   b. film forming polymer added as an oil-in-water emulsion where the polymer forms a film through evaporation of volatiles or through curing and where the film forming polymer is present in an amount of around at least 10 weight percent of the solids of the aqueous chemical treating composition and where the polymer is essentially free of any primary or secondary nitrogen containing moieties,
   c. fiber lubricant essentially free of any primary or secondary nitrogen containing moieties and present in an effective lubricating amount,
   d. water-soluble polymer selected from the group consisting of: silylated poly(vinyl alcohol) and copolymers, and
   e. water to give an effective total solids and viscosity for the treating composition for application to the fibers.

14. Fiber of claim 13, wherein the water soluble silylated poly(vinyl alcohol) has an amount of silylation in the range of 1 to 50 percent of the polymer and is present in the aqueous chemical treating composition in an amount greater than 10 weight percent of the solids of the aqueous chemical treating composition.

15. Fiber of claim 1, wherein the amount of unsaturated organo-compound is in the range of 4 to 15 weight percent of the solids of the aqueous chemical treating composition.

16. Fiber of claim 7, wherein the amount of the nonionic surfactant to produce the fortified dispersion is in the range of about 5 to about 10 weight percent of the dispersion.

17. Fiber of claim 8, wherein the amount of the polyoxyethylene polyol present in the aqueous treating composition is in the range of 0.1 to 0.6 weight percent of the solids of the aqueous treating composition.

18. Fiber of claim 1, wherein the water soluble silylazide includes tetraethylorthosilicate.

19. Fiber of claim 3, wherein the water soluble silylazide includes tetraethylorthosilicate.

20. Fiber of claim 13, wherein the water soluble silylazide includes tetraethylorthosilicate.

21. Fiber of claim 1, wherein the stabilizing agent is the fortified dispersion of a matrix-compatible film former where the dispersion is present in an amount of at least 10 weight percent of the solids of the aqueous chemical treating composition.

22. Fiber of claim 1, wherein the stabilizing agent is the unsaturated organo compound present in an amount of about 4 to 15 weight percent of the solids of the aqueous chemical treating composition and of around 5 percent or more of the silylazide present in the aqueous chemical treating composition.

23. Fiber of claim 1, wherein the poly(vinyl alcohol) copolymers are selected from the group consisting of: copolymers with vinyl acetate, unsaturated aliphatic dicarboxylic acid, dialkyl esters, acrylic acid alkyl esters and vinyl alkyl ethers, crotonic acid and olefin comonomers, maleic acid monoalkyl ester, lactone rings, and methyl methacrylate.

24. Fiber of claim 3 that includes another stabilizing agent that is selected from the group consisting of: silylated poly(vinyl alcohol), poly(vinyl alcohol), silylated poly(vinyl alcohol) copolymers and poly(vinyl alcohol) copolymers selected from the group consisting of: copolymers with vinyl acetate, unsaturated aliphatic dicarboxylic acid, dialkyl esters, acrylic acid alkyl esters and vinyl alkyl ethers, crotonic acid and olefin comonomers, maleic acid monoalkylester, lactone rings, and methyl methacrylate.

25. Fiber of claim 1, wherein the silylazide has the formula silane-R-azide wherein the azide is selected from the group consisting of: sulfonyl azide, azidoformate, and diazoaldanoate wherein the R groups are organic radicals.

26. Fiber of claim 3, wherein the silylazide has the formula silane-R-azide wherein the azide is selected from the group consisting of sulfonyl azide, azidoformate, and diazoaldanoate wherein the R groups are organic radicals.

27. Chemically treated high modulus fiber having thereon an aqueous chemical treating composition, comprising:
   a. water soluble silylazide in an effective coupling agent amount in the range of around 5 to about 70 weight percent of the solids of the aqueous chemical treating composition,
   b. film forming polymer present as an oil-in-water dispersion where the polymer forms a film through evaporation of volatiles or through curing and where the film forming polymer is present in an amount of around at least 10 weight percent of the solids of the aqueous chemical treating composition and where the polymer is essentially free of any primary or secondary nitrogen-containing moieties,
   c. at least one stabilizing agent selected from the group consisting of: 1) silylated poly(vinyl alcohol), 2) at least medium molecular weight poly(vinyl alcohol) having a molecular weight of 30,000 to 105,000 weight average molecular weight, 3) unsaturated organo compounds selected from the group consisting of: i) organosilane coupling agents selected from the group consisting of: methacrylamide-containing organosilane, vinyl-containing organosilanes, where the silane has alkoxy, hydroxy, acryloxy groups and a mixture thereof; methacryloxypropyltrimethoxysilane; and b-(N-vinylbenzyl-amino)ethyl-gamma-aminopropyltrimethoxysilane monohydrogen chloride; and ii) unsaturation-containing organic monomers reactable with the matrix polymer; and 4) mixtures thereof; wherein the silylated poly(vinyl alcohol) and poly(vinyl alcohol) are present in the oil-in-water dispersion to give a fortified, stabilizing dispersion having a total solids of 1 to 80 weight percent and where the dispersion is present in the aqueous chemical treating composition in an amount of at least 10 weight percent for a dispersion having 60 weight percent solids; and wherein the unsaturated organo compound is present in the range of 4 to 15 weight percent of the solids of the aqueous chemical treating composition,
   d. fiber lubricant essentially free of any primary or secondary nitrogen containing moieties and present in an effective lubricating amount, and
   e. water to give an effective total solids and viscosity for the treating composition for application to the fibers.

28. Fiber according to claim 27, wherein the water soluble silylazide includes tetraethylorthosilicate and the unsaturated organo compounds are selected from the group consisting of organosilane coupling agents having unsaturation in the organic moiety including methacrylamide-containing organosilane, vinyl-containing organosilane where the silane has alkoxy, hydroxy, acryloxy groups and a mixture thereof, including methacryloxypropyltrimethoxysilane, and b-(N-vinyl-benzyl-amino)ethyl-gamma-aminopropyltrimethoxysilane monohydrogen chloride; and mixtures thereof.

29. Fiber according to claim 1, wherein the amount of water that is present is sufficient to give a total solids for the aqueous treating composition in the range of about 5 to about 30 weight percent.

30. Fiber according to claim 1, wherein the viscosity of the aqueous chemical treatment is less than around 150 centipoise at 25 degrees.

* * * * *